United States Patent Office 3,551,335
Patented Dec. 29, 1970

3,551,335
METAL WORKING LUBRICANTS
Norbert Schwartz, James F. Richards, and Joseph F. Pistell, Homer, N.Y., assignors to Pennwalt Corporation, Philadelphia, Pa., a corporation of Pennsylvania
No Drawing. Continuation-in-part of application Ser. No. 686,300, Nov. 28, 1967. This application Feb. 14, 1969, Ser. No. 799,492
Int. Cl. C10m 1/24, 1/32
U.S. Cl. 252—34.7      9 Claims

ABSTRACT OF THE DISCLOSURE

Lubricant compositions particularly useful for metal working comprising a soap base and as an improving agent, an ester reaction product of an acetylenic alcohol or an acetylenic glycol with a fatty acid containing at least about eight carbon atoms or an anhydride, ester, or amide of such fatty acid.

---

This application is a continuation-in-part of Ser. No. 686,300, filed Nov. 28, 1967 and now abandoned.

Metal working lubricants used in water solution are well-known for various metal forming operations, and are particularly useful for "wet drawing" of steel, copper, copper coated steel, nickel finished steel, galvanized steel, and other types of metal wire drawing and metal working operations. This invention provides an improved lubricant for such metal forming operations which comprises a soap based lubricant formulation containing from about 1.0 to 10.0 percent by weight of the reaction product of an acetylenic alcohol or acetylenic glycol with a fatty acid containing at least about eight carbon atoms or an anhydride, ester or amide of such fatty acid.

The soap based lubricant may be any one of the well known types wherein a long chain acid and base are reacted to make the soap. Such soap based lubricants are discussed in the article appearing at page 142 of Chemical Engineering, vol. 61, June 1954, and are exemplified by the soaps made from tall oil fatty acids, red oil fatty acids, and the like, and strong bases such as an alkali metal hydroxide or a strong amine compound. Frequently, additional additives are incorporated into this soap base and in the lubricant compositions of this invention it is preferred to have present liquid polyoxyalkylene derivatives of alkylene glycols, and most preferably these additives will be a polyoxypropylene derivative of propylene glycols having molecular weight of about 2,000 or a methoxypolyethylene glycol having a molecular weight of about 2,000.

The acetylenic reaction product additive is simply incorporated into the lubricant base to give improved lubricity characteristics as will be seen in the examples which follow.

Specific examples of acetylenic alcohols and acetylenic glycols which are useful in making the additives for the present invention include:

(1) Methyl butynol and methyl pentynol. These compounds are prepared by the addition of unsaturated compounds to ketones, yielding, in the case of acetone, methyl butynol.

$$CH_3-C=O+H-C\equiv C-H, \quad CH_3-\underset{\underset{OH}{|}}{\overset{\overset{CH_3}{|}}{C}}-C\equiv C-H$$
$$\underset{CH_3}{|}$$

These compounds are sold by the Air Reduction Chemical and Carbide Company, a Division of Air Reduction Company, Inc., and are described in Technical Bulletin A–1 of the Organic Chemicals Department—April 1964.

(2) "Surfynol" 82, and "Surfynol" 61, "Surfynol" 104 and "Surfynol" 440 having the following structural formulas:

$$CH_3-CH_3-\underset{\underset{OH}{|}}{\overset{\overset{CH_3}{|}}{C}}-C\equiv C-\underset{\underset{OH}{|}}{\overset{\overset{CH_3}{|}}{C}}-CH_2-CH_3$$

Surfynol 82
(3,6-dimethyl-4-octyne-3,6-diol)

$$HC\equiv C-\underset{\underset{CH_3}{|}}{\overset{\overset{OH}{|}}{C}}-CH_2-CH-CH_3$$
$$\underset{CH_3}{|}$$

Surfynol 61
(3,5-dimethyl-1-hexyne-3-ol)

$$CH_3-CH-CH_2-\underset{\underset{OH}{|}}{\overset{\overset{CH_3}{|}}{C}}-C\equiv C-\underset{\underset{OH}{|}}{\overset{\overset{CH_3}{|}}{C}}-CH_2-CH-CH_3$$

Surfynol 104
(2,4,7,9-tetramethyl-5-decyne-4,7-diol)

$$CH_3-CH-CH_2-\underset{|}{\overset{\overset{CH_3}{|}}{C}}-C\equiv C-\underset{|}{\overset{\overset{CH_3}{|}}{C}}-CH-CH_2-CH_3$$

$$\left[\begin{array}{c} O \\ | \\ CH_2 \\ | \\ CH_2 \\ | \\ O \\ | \\ H \end{array}\right]_m \left[\begin{array}{c} O \\ | \\ CH_2 \\ | \\ CH_2 \\ | \\ O \\ | \\ H \end{array}\right]_n \quad m+n=3.5 \text{ moles of ethylene oxide}$$

Surfynol 440
(ethxylated 2,4,7,9-tetramethyl-5-decyne-4,7-diol)

In general, the acetylenic compounds will have the structure R—C≡C—R where R is hydrogen, an alkyl, a hydroxyalkyl, or a hydroxyalkoxy group, preferably of two to ten carbon atoms, and with the proviso that at least one R group contains a hydroxyl group.

In order to exemplify the acetylenic alcohol, acetylenic glycol and ethoxylated acetylenic glycol reaction products the following examples are given:

EXAMPLE A

Forty grams of stearic acid were placed in a 300 ml. Erlenmeyer flask. Two drops of concentrated hydrochloric acid, 150 ml. of absolute methyl alcohol, and 10 grams of dimethyl hexyndiol were added. This was refluxed for 36 hours. The excess methyl alcohol was distilled off, and the mass was heated 24 hours at 110° C.

Examples B through G, as detailed in Table I, were made in the manner outlined for Example A.

EXAMPLE H

Thirty-seven and a half grams of Dimer 1016 fatty acid were placed in a 300 ml. Erlenmeyer flask. One drop of concentrated hydrochloric acid and 100 ml. of absolute methyl alcohol were added. This was refluxed for 48 hours. The excess methyl alcohol was distilled off. Seventeen grams of Surfynol 61 were added, and then heated for 50 hours at 110° C.

This general technique may be summarized as follows:

To one equivalent portion of carboxylic acid, or acid anhydride, add 0.8 to 3.0 equivalent portions of acetylenic alcohol, acetylenic glycol, or ethoxylated acetylenic glycol. A quantity between none and several percent, preferably between 0.05 and 1.0 percent of concentrated hydrochloric acid may be added. Refluxing is carried out with excess absolute methyl alcohol, preferably between one and 10 times the weight of the other components present, for 5 to 100 hours preferably 10 to 50 hours. The excess methyl alcohol is distilled off, and the product is heated at 100 to 140° C., preferably between 102° and 120° C., for 5 to 100 hours.

As demonstrated in Example H, the methyl ester may be prepared, and then combined with the acetylenic component for the second stage of the reaction.

The use of an acid anhydride, as a starting component, is demonstrated in Example I.

EXAMPLE I

To a 300 ml. Erlenmeyer flask were added 35.5 grams of chlorendic anhydride, one drop of concentrated hydrochloric acid, and 125 ml. of absolute methyl alcohol. After refluxing for 48 hours, the excess methyl alcohol was removed by distillation. Twenty-seven and four tenths grams of Surfynol 82 were added, and then heated for 36 hours at 110° C.

Examples J and K were made in similar manner.

Example L demonstrates the reaction product of an acid chloride, and an acetylenic glycol.

EXAMPLE L

To 37.5 grams of Dimer 1016 at 30 to 40° C., a quantity of 16.5 grams of $PCl_3$ was added over 1½ hours using a magnetic stirrer. Mixing was continued two hours at 40° C.

The mixture was heated to 86° C. at 38.5 cm. of mercury (under partial vacuum 76.0−37.5=38.5) to remove the excess $PCl_3$.

After cooling to 50° C., 40 grams benzene were added. A separate combination of 17 grams Surfynol 61, 32 grams pyridine, and 30 grams benzene was prepared. This Surfynol, pyridine, benzene mixture was added to the Dimer 1016 chloride over a period of 1½ hours at 45 to 55° C. Mixing was continued for two more hours.

The mass was allowed to stand overnight at room temperature, and was then filtered through Whatman No. 541 filter paper.

Under 31.0 cm. mercury pressure (a partial vacuum, 76.0−45.0=31.0), the solvents were distilled by heating the mass up to 120° C. The product was cooled to 50° C. before returning to atmospheric pressure.

Examples M and N demonstrate the use of sulfuric acid rather than hydrochloric acid.

EXAMPLE M

A mixture of 124 grams of Dimer 1016, 25 ml. methyl alcohol and three drops of concentrated sulfuric acid were refluxed 21 hours.

After distilling off the excess methyl alcohol, the methyl ester had one percent free fatty acid. The ester was washed with cold water to remove the sulfuric acid, and then dried overnight at 110° C.

The ester was mixed with 166 grams of Surfynol 104, and the mixture was heated 35 hours at 110° C.

The Dimer and Trimer fatty acids used above are well known in the art. Their preparation and properties are set forth in several U.S. patents, including 2,482,761 to Goebel. Subsequent patents have reviewed the earlier literature and technology. For example, U.S. Pat. 3,048,542 to Tierney and Krug, and U.S. Pat. 3,223,635 to Dwyer and Jedenoff.

The 1016 Dimer acid manufactured by Emery Industries, Inc., is a saturated mixture of approximately 85% $C_{36}$ dibasic acid, and 13% $C_{54}$ tribasic acid, having acid value of 190–198; sap. value 194–200; color, Gardner (max.) 7; neutral equivalent 284–295; unsap. max. 0.5%; monobasic acids, 1 max. o/o.

The 1040 Trimer acid, manufactured by Emery Industries, Inc., is a saturated mixture, containing approximately 91% $C_{54}$ tribasic acid and 5% $C_{36}$ dibasic acid; sap. value 192–200; acid value 183–191.

EXAMPLE N

A mixture of 124 grams of Dimer 1016, 250 ml. methyl alcohol, and four drops of concentrated sulfuric acid was refluxed 21 hours. The excess methyl alcohol was removed by heating to 110° C. under partial vacuum (76.0−37.4=38.6 cm. Hg). The free fatty acid of the ester was 1.3%.

To the ester were added 160 grams Surfynol 104 and 20 grams anhydrous $CaSO_4$. This was heated ½ hour at 115° C. (76.0−30.2=45.8 cm. Hg), and ½ hour at 150° C. (76.0−37.4=38.6 cm. Hg). Gas evolution continued, so the mixture was heated 20 hours at 110–115° C. at atmospheric pressure.

The product was mixed with three parts isopropyl alcohol and the $CaSO_4$ allowed to settle out. The isopropyl alcohol was removed by heating to 90° C. (76.0−50.0=26.0 cm. Hg), and the four hours at 113° C., and atmospheric pressure.

In Example O, an acetylenic alcohol was reacted with a brominated amide.

EXAMPLE O

Into a 500 ml. glass stoppered Erlenmeyer flask were added 28 grams of Armour & Co. Amid O, 9 grams of bromine and 300 ml. of carbon tetrachloride. This was allowed to stand at room temperature for eight hours. The flask and contents were then heated to 110° C. for 12 hours to remove the carbon tetrachloride and any unreacted bromine. Nineteen and seven-tenths grams ethyl octynol were added, and the flask and contents were retained at 110° C. for 24 hours.

The Amid O, manufactured by the Armour Industrial Chemical Company, Chicago, Ill., is a primary amide, $RCONH_2$ in which the R is an oleyl radical. The Amid O has an iodine value of 80 to 90, and a free fatty acid of 3.5 maximum.

Example P was made in an analogous manner, using the Armour Armeen T. The Armeen T is a primary amine, $RNH_2$, in which R is the tallow radical. The Armeen T has an iodine value of 38 to 48.

The preparation of reaction product examples is summarized in Table I. The Fatty Acid Council (FAC) color scale was used. Specific gravities were measured by weighing 0.50 cc. of sample in a Becton, Dickinson & Co., Cat. No. 1/2 YT, ½ cc. tuberculin syringe at 25° C.

TABLE I

| Example Number | Reactants | Weight, grams | Mole fractionation | Acid No. | Sp. gr., 25° C./25° C. | FAC color |
|---|---|---|---|---|---|---|
| A | Stearic acid | 40.0 | 0.14 | 45 | * | 9 |
|   | Dimethyl hexynediol | 10.0 | 0.07 | | | |
| B | Dimer 1016 | 37.5 | 0.066 | 15 | * | 15 |
|   | Dimethyl hexynediol | 10.0 | 0.070 | | | |
| C | Dimer 1016 | 56.4 | 0.10 | 8 | 0.904 | 11B |
|   | Surfynol 104 | 22.6 | 0.12 | | | |
| D | Hydroxyphenyl stearic acid | 28 | 0.074 | 8 | 0.921 | 17 |
|   | Dimethyl hexynediol | 5 | 0.035 | | | |
| E | Dimer 1016 | 37.5 | 0.066 | 6 | 0.929 | 17 |
|   | Methyl pentynol | 13.8 | 0.141 | | | |
| F | Undecylenic acid | 36.8 | 0.200 | 6 | 0.894 | 7 |
|   | Surfynol 104 | 30.0 | 0.106 | | | |
| G | Dimer 1016 | 28 | 0.050 | 3 | 0.947 | 11B |
|   | Surfynol 440 | 25 | 0.052 | | | |
| H | Dimer 1016 | 37.5 | 0.066 | 6 | 0.945 | 11B |
|   | Surfynol 61 | 17.0 | 0.137 | | | |

See footnote at end of table.

TABLE I—Continued

| Example Number | Reactants | Weight, grams | Mole fraction-ation | Acid No. | Sp. gr., 25° C./25° C. | FAC color |
|---|---|---|---|---|---|---|
| I | Chlorendic anhydride | 38.5 | 0.10 | 72 | * | 19 |
| | Surfynol 82 | 27.4 | 0.10 | | | |
| J | Dodecenyl succinic anhydride | 25.0 | 0.094 | 74 | 0.926 | 5 |
| | Surfynol 104 | 25.0 | 0.109 | | | |
| K | Phthalic anhydride | 20.0 | 0.134 | 105 | 0.986 | 17 |
| | Surfynol 104 | 31.0 | 0.134 | | | |
| L | Dimer 1016 | 37.5 | 0.066 | 62 | 0.967 | 19 |
| | Surfynol 61 | 17.0 | 0.137 | | | |
| M | Dimer 1016 | 124 | 0.218 | 16 | 0.887 | 18 |
| | Surfynol 104 | 166 | 0.719 | | | |
| N | Dimer 1016 | 124 | 0.218 | 15 | 0.912 | 15 |
| | Surfynol 104 | 160 | 0.692 | | | |
| O | Brominated Amid O | 36.1 | 0.10 | 40 | * | 45+ |
| | Ethyl Octynol | 19.7 | 0.10 | | | |
| P | Brominated Armeen O | 69.7 | 0.20 | 80 | * | 45+ |
| | Ethyl Octynol | 39.4 | 0.20 | | | |
| Q | Phosphorated methyl ester of soya fatty acid | 45.5 | 0.10 | 5 | * | 30 |
| | Surfynol 104 | 92 | 0.10 | | | |
| R | Trimer 1040 | 37.5 | 0.046 | 5 | * | 25 |
| | Surfynol 104 | 17.5 | 0.077 | | | |

* Sample was semi-solid, or solid, at 25° C.

Viscosities, as shown in Table II, following, were measured by use of a Cannon-Manning semi-micro viscometer, Cat. No. CMSHU having a constant of 0.104 centistoke per second and requiring approximately 1 ml. of sample.

TABLE II

| | Viscosity S.S.U. at 25° C. | Viscosity S.S.U. at 40° C. |
|---|---|---|
| Example No: | | |
| A | X | X |
| B | X | X |
| C | 455 | |
| D | 1,590 | |
| E | 726 | |
| F | 39 | |
| G | 675 | |
| H | 214 | |
| I | X | |
| J | 1,500 | |
| K | | 215 |
| L | 1,200 | |
| M | 255 | |
| N | 250 | |
| O | X | X |
| P | X | |
| Q | X | |

X sample was semi-solid, or unsuited for measurement.

The present invention is in no way limited by any theory concerning the structure of the complex reaction products. To further characterize the reaction products, the experimentally observed saponification values, iodine values, and hydroxyl values, tabulated along with the theoretical, calculated, values in Table III, following.

TABLE III

| | Saponification value observed | Saponification value calculated | Iodine value observed | Iodine value calculated | Hydroxyl value observed | Hydroxyl value calculated |
|---|---|---|---|---|---|---|
| Example No.: | | | | | | |
| A | 183 | 167 | 6 | 75 | 22 | 0 |
| B | 75 | 162 | 75 | 76 | 15 | 11 |
| C | 138 | 144 | 78 | 66 | 7 | 2 |
| D | 129 | 131 | 59 | 56 | 130 | 129 |
| E | 154 | 150 | 64 | 79 | 17 | 66 |
| F | 165 | 177 | 105 | 108 | 28 | 77 |
| G | 103 | 106 | 68 | 66 | 102 | 40 |
| H | 174 | 140 | 64 | 86 | 14 | 26 |
| I | 173 | 213 | 28 | 96 | 43 | 0 |
| K | 267 | 311 | 69 | 141 | 76 | 0 |

The tests demonstrating the lubricating value of these reaction products were performed by use of a Falex tester. The lubricant formulations were dissolved in distilled water to provide a concentration of 2.5% by weight of total lubricating materials, and a total water content of 97.5% by weight. Steel pins, type 1117, and type 4620 steel V-blocks were used in the evaluation. The Falex tester is manufactured by the Faville-LeValley Corporation, 1129 Bellwood Ave., Bellwood, Ill.

As a reference lubricant formulation and a medium in which to incorporate the unsaturated compounds, the following composition was used:

FORMULATION I

| | Percent |
|---|---|
| Tall oil fatty acid | 17.8 |
| 45% KOH | 7.2 |
| Polyoxypropylene derivative of propylene glycol, M.W. 2,000 ("Pluracol" P-2010, made by Wyandotte Chemicals Corporation) | 6.7 |
| Water | 68.3 |
| | 100.0 |

In the formulations all percentages are by weight.

This type of lubricant can be used in water solution for the "wet drawing" of steel, copper, copper coated steel, liquor finished steel, galvanized steel, and other types of metal wire drawing.

The evaluation by the Falex tester demonstrated the enhanced lubrication shown as wear rate data.

The Falex data is presented in Table IV, listing wear rate data.

FORMULATION II-A

| | Percent |
|---|---|
| Tall oil fatty acid | 17.8 |
| 45% KOH | 7.2 |
| Pluracol P-2010 | 6.7 |
| Reaction Product A (Table I) | 5.4 |
| Surfynol 104 | 3.6 |
| Water | 59.3 |
| | 100.0 |

FORMULATION II-B

| | Percent |
|---|---|
| Tall oil fatty acid | 17.8 |
| 45% KOH | 7.2 |
| Pluracol P-2010 | 6.7 |
| Reaction Product B (Table I) | 5.4 |
| Surfynol 104 | 3.6 |
| Water | 59.3 |
| | 100.0 |

Note that Formulations II-A, etc., are a basic formulation in which the acetylenic reaction products were evaluated. The reaction products A, B, C, etc., are identified in Table I.

TABLE IV.—WEAR RATE VALUES FROM FALEX EVALUATION "STEEL ON STEEL"

| Load | I | II-A | II-B | II-C | II-D | II-E | II-F | II-G | II-H | II-I | II-J | II-K | II-L | II-M | II-N | II-O | II-P | II-Q | II-R$_8$ |
|---|---|---|---|---|---|---|---|---|---|---|---|---|---|---|---|---|---|---|---|
| 1,500 | 18 | 17 | 17 | 15 | 9 | 11 | 12 | 12 | 18 | 11 | 17 | 14 | 9 | 10 | 7 | 12 | 9 | 9 | |
| 2,000 | 35 | 23 | 23 | 19 | 14 | 14 | 15 | 17 | 24 | 16 | 26 | 16 | 17 | 12 | 27 | 19 | 11 | 12 | 12 |
| 2,500 | 69 | 30 | 30 | 28 | 44 | 26 | 37 | 49 | 31 | 22 | 32 | 20 | 40 | (*) | 63 | 21 | 16 | (*) | 51 |
| 3,000 | 141 | 37 | 43 | 40 | | 59 | | 95 | 47 | 40 | 37 | 59 | (*) | | (*) | 28 | 44 | | 67 |
| 3,500 | (*) | 70 | 56 | 75 | | | | | 93 | 45 | | | | | | 85 | (*) | | (*) |

*Seizure occurred before this load was reached.

It is obvious from the above data that the lubricant formulations containing the additives in accord with this invention are all significantly superior to the control formulation.

An evaluation of the reaction products as lubricating agents for copper was conducted by use of the Falex tester. The lubricant formulations were dissolved in distilled water to give 2.5% by weight total lubricating materials, 97.5% by weight water. Electrolytic copper test pins and grade 302 stainless steel test blocks were used.

TABLE V.—WEAR RATE VALUES FROM FALEX EVALUATION COPPER ON STAINLESS STEEL

| | Formulation | |
|---|---|---|
| | I | VIII-O |
| Load: | | |
| 200 | 3 | 3 |
| 300 | 5 | 3 |
| 400 | 13 | 8 |
| 500 | * | 21 |
| 600 | | 36 |
| 700 | | 140 |

*Seizure occurred before this load was reached.

Additional illustrative examples follow:

FORMULATION III (Control)

| | Percent |
|---|---|
| Red oil fatty acid | 12.4 |
| Petroleum sulfonate HLHV | 6.6 |
| Butyl stearate | 11.1 |
| Pluracol P-2010 | 5.5 |
| Ucon 50HB-280-X* | 6.6 |
| Triethanolamine | 5.3 |
| 45% KOH | 3.2 |
| Water | 49.3 |
| | 100.0 |

FORMULATION IV

| | Percent |
|---|---|
| Red oil fatty acid | 11.9 |
| Petroleum sulfonate HLHV | 6.4 |
| Butyl stearate | 5.4 |
| Pluracol P-2010 | 5.4 |
| Ucon 50HB-280-X | 6.4 |
| Triethanolamine | 5.1 |
| 45% KOH | 3.1 |
| Surfynol 104 | 3.6 |
| Reaction Product D (Table I) | 5.4 |
| Water | 47.3 |
| | 100.0 |

FORMULATION V

| | Percent |
|---|---|
| Red oil fatty acid | 11.9 |
| Petroleum sulfonate HLHV | 6.4 |
| Butyl Stearate | 5.4 |
| Pluracol P-2010 | 5.4 |
| Ucon 50HB-280-X | 6.4 |
| Triethanolamine | 5.1 |
| 45% KOH | 3.1 |
| Surfynol 104 | 3.6 |
| Reaction Product F (Table I) | 5.4 |
| Water | 47.3 |
| | 100.0 |

* A proprietary polyalkylene glycol having a viscosity of 280 SSU at 100° F., a viscosity index of 150, a pour point of −35° F. and a flash point of 500° F. made by Union Carbide Company.

The above formulations show the following wear rate values from Falex evaluations of "Steel on Steel":

| | III | IV | V |
|---|---|---|---|
| Formulation—Load: | | | |
| 1,500 | 13 | 11 | 10 |
| 2,000 | 33 | 23 | 21 |
| 2,500 | 35 | 27 | 23 |
| 3,000 | 35 | 27 | 42 |
| 3,500 | 83 | 53 | 50 |

It will be understood that numerous changes and modifications may be made from the above disclosure without departing from the spirit and scope of the invention.

We claim:

1. A lubricant composition, comprising a major amount of water, a soap base selected from the group consisting of alkali metal soaps of fatty acids and amine soaps of fatty acids and, as an improving agent, an ester reaction product about 0.8 to 3.0 equivalent portions of an acetylenic compound having the formula R—C≡C—R, where R is hydrogen, alkyl, hydroxyalkyl or hydroxyalkoxy of two to ten carbon atoms, and where at least one R contains a hydroxy group, with about one equivalent portion of a carboxylic acid containing at least about eight carbon atoms or an anhydride, ester, or amide of such carboxylic acid.

2. A lubricant as in claim 1 where the improving agent is the ester reaction product of stearic acid and dimethyl hexyndiol.

3. A lubricant as in claim 1 where the improving agent is the ester reaction product of brominated oleylamide and ethyloctylnol.

4. A lubricant as in claim 1 where the improving agent is the ester reaction product of dodencenyl succinic anhydride and 2,4,7,9-tetramethyl-5-decyne-4,7-diol.

5. A lubricant as in claim 1 where the improving agent is the ester reaction product of chlorendic anhydride and 3,6-dimethyl-4-octyne-3,6-diol.

6. A lubricant as in claim 1 where the improving agent is the ester reaction product of a mixture of dimers and trimers of high molecular weight fatty acids and 2,4,7,9-tetramethyl-5-decyne-4,7-diol.

7. A lubricant as in claim 1 where the improving agent is the ester reaction product of a mixture of dimer and trimers of high molecular weight fatty acids and 3,5-dimethyl-1-hexyne-3-ol.

8. A lubricant as in claim 1 where the improving agent is the ester reaction product of a mixture of dimer and trimers of high molecular weight fatty acids and ethoxylated 2,4,6,9-tetramethyl-5-decyne-4,7-diol containing approximately 3.5 moles of ethylene oxide per mole of diol.

9. A lubricant as in claim 1 where the improving agent is an ester reaction product of phthalic anhydride and 2,4,7,9-tetramethyl-5-decyne-4,7-diol.

References Cited

UNITED STATES PATENTS

| | | | |
|---|---|---|---|
| 2,662,836 | 12/1953 | Montgomery et al. | 252—42X |
| 2,959,553 | 11/1960 | Rowlands et al. | 252—56 |
| 3,041,281 | 6/1962 | Winsor et al. | 252—42 |
| 3,304,258 | 2/1967 | White et al. | 252—42X |

DANIEL E. WYMAN, Primary Examiner

W. J. SHINE, Assistant Examiner

U.S. Cl. X.R.

252—42, 42.4